United States Patent [19]

Hajzler

[11] Patent Number: 5,017,868
[45] Date of Patent: May 21, 1991

[54] BEARING ASSEMBLY WITH ENCODER RING IN SLIDABLE CONTACT WITH SENSOR

[75] Inventor: Christian Hajzler, Annecy, France

[73] Assignee: The Torrington Company, Torrington, Conn.

[21] Appl. No.: 486,684

[22] Filed: Mar. 1, 1990

[30] Foreign Application Priority Data

Apr. 18, 1989 [FR] France ............................. 89 05096

[51] Int. Cl.⁵ ................. F16C 32/00; G01B 7/30; G01P 3/487
[52] U.S. Cl. .................. 324/207.22; 324/174; 324/207.25; 384/448
[58] Field of Search ............ 324/173, 174, 207.22, 324/207.25, 207.20; 73/517 R, 518, 519; 310/155, 168; 384/446, 448; 188/181 R; 180/141–143

[56] References Cited

U.S. PATENT DOCUMENTS

| | | | |
|---|---|---|---|
| 3,683,219 | 8/1972 | Kruse | 324/174 X |
| 3,716,121 | 2/1973 | Frigger | 324/174 X |
| 3,742,243 | 6/1973 | Gamble | 324/171 X |
| 3,890,517 | 6/1975 | Marsh et al. | 324/173 X |
| 4,017,756 | 4/1977 | Davidson | 310/168 |
| 4,161,120 | 7/1979 | Cloarec | 324/173 X |
| 4,667,156 | 5/1987 | Machino et al. | 324/173 |

Primary Examiner—Gerard R. Strecker
Attorney, Agent, or Firm—Michael H. Minns

[57] ABSTRACT

An encoder ring with multiple North and South poles around its circumference is connected to the rotatable race of a bearing assembly for rotation with the rotatable race. A sensor is connected to the fixed race. The encoder ring is kept in slidable contact with the sensor. The slidable contact is maintained by a flexible member which keeps the encoder ring in slidable contact with the sensor.

12 Claims, 2 Drawing Sheets

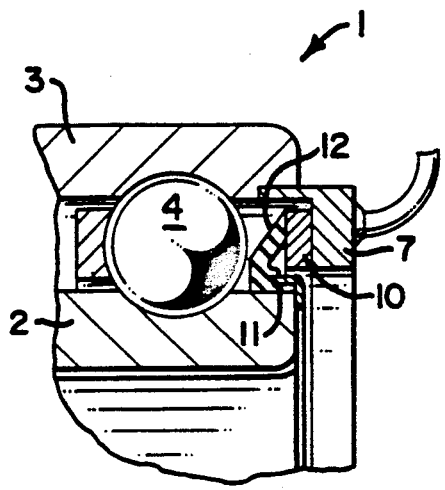
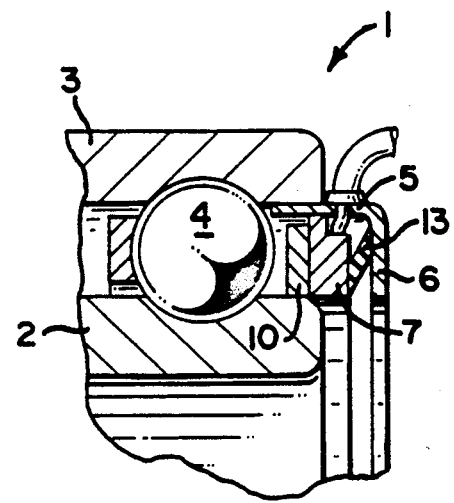
FIG. 1  FIG. 2
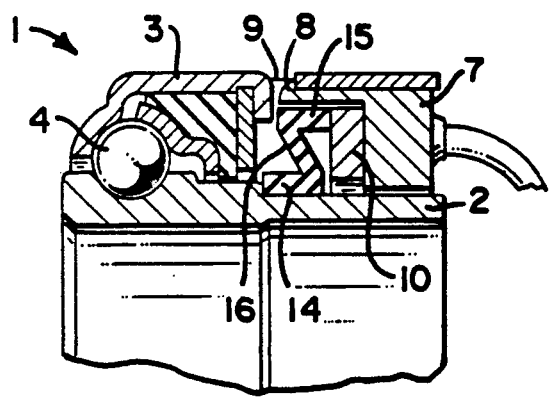
FIG. 3
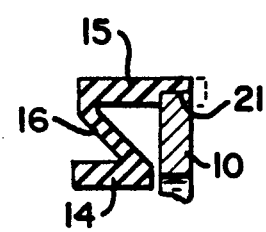
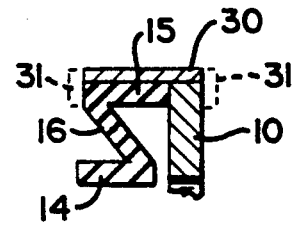
FIG. 4  FIG. 5

BEARING ASSEMBLY WITH ENCODER RING IN SLIDABLE CONTACT WITH SENSOR

BACKGROUND OF THE INVENTION

This invention relates to bearings. More particularly, this invention is a bearing assembly with an encoder having multiple North and South poles arranged circumferentially around the encoder, and the encoder is kept in slidable contact with a sensor.

U.S. Pat. No. 3,742,243 describes a signal generator in which a rotor supporting annular magnets is mounted on a rotating shaft near a sensor and is separated from the sensor by a constant clearance.

To maintain the optimum clearance requires a great deal of care. Moreover, when the rotor is mounted on a rotating shaft, the axis of which is not precisely coaxial, the magnetic ring cannot be adjusted beforehand.

SUMMARY OF THE INVENTION

Briefly described, the bearing assembly comprises an inner race and an outer race providing an inner race—outer race annulus. One of the races is fixed, the other race is rotatable. Rolling members are located in the annulus around the inner race circumference. An encoder ring with multiple North and South poles around its circumference is connected to the rotatable race for rotation with the rotatable race. A sensor is connected to the fixed race. Means having a flexible portion keeps the encoder ring in slidable contact with the sensor.

The bearing can be used in steering columns of automotive vehicles.

Other characteristics and advantages of the invention are described in the exemplary embodiments with reference to the attached drawings:

BRIEF DESCRIPTION OF THE DRAWING FIGURES

FIG. 1 shows in cross-section one-half of a preferred embodiment of the invention;

FIG. 2 shows in cross-section one-half of a further preferred embodiment of the invention;

FIG. 3 shows in cross-section one-half of a further preferred embodiment of the invention:

FIGS. 4 through 9 illustrate exemplary embodiments of the mounting of an encoder on an elastic ring;

DETAILED DESCRIPTION

Figure 6:
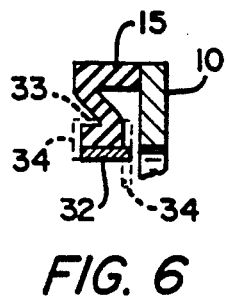

FIG. 1 shows a bearing assembly consisting of a ball bearing 1 formed by an inner rotating ring 2, and an outer fixed ring 3, providing an inner race—outer race annulus. Raceways are formed on said rings and balls 4 contact said raceways. Outer ring 3 is coaxial with ring 2 and permits the attachment of a magnetic field magnetic field sensor 7 which is held in outer ring 3. Encoder ring 10 is connected to mounting ring 11 by a conventional bonding process (adhesive agent, casting, etc.) and held in slidable contact with magnetic field sensor 7. The encoder ring has multiple North and South poles around its circumference.

The sensor 7 can be any of the well known magnetic field sensors such as a Hall-effect detector. The sensor 7 is attached to the ring 3 by any known method such as adhesive. An appropriate surface for sliding contact with the encoder ring 10 can be provided by encapsulating the sensor 7 in potting compound or mounting in a housing or any other known technique.

According to the invention, mounting ring 11 has a specific radial section which gives it omnidirectional elasticity. For this purpose, ring 11 has a functional zone that is deformable under the effect of bending, compression, or sheer stress.

According to FIG. 1, ring 11 has a flexible portion such as a deformable skirt, which is illustrated by elastic segment 12.

Contact between encoder 10 and sensor 7 is provided in all relative positions between the encoder and the support of the sensor, regardless of whether the operating status of the encoder is dynamic or static.

Ring 11, furthermore, is attached directly or indirectly to inner race 2 of the bearing by any known process such as by an adhesive. The elastic portion 12 of FIG. 1 tapers radially inwardly from the encoder towards the inner race.

Referring to FIG. 2, encoder 10 is mounted on ring 2 of the bearing, while sensor 7 is enclosed by an annular member 5 mounted on ring 3 of the bearing. Annular member 5 has a radially extending flange 6 axially spaced from sensor 7. Flexible ring 13 has axial and radial elasticity. Flexible ring 13 is an elastic ring having its axial ends connected to the sensor 7 and the flange at radially offset points. Sensor 7 which is permanently attached to the side of ring 13 keeps slidable contact with encoder 10 regardless of the mounting conditions of the encoder.

In FIG. 3, the flexible ring which is mounted about the inner race has two radially separated axially extending portions, 14 and 15, interconnected by the diagonal flexible portion 16. Also shown in FIG. 3 is an alternate method of mounting the sensor 7 on the ring 3. The sensor 7 has axially extending locking fingers 8 which engage corresponding latch holes 9 in the ring 3.

From the aforementioned examples, it can be seen that the cross-section of the flexible ring can vary from one mounting example to another without in any way going beyond the scope of the invention.

Moreover, ring 11 in its different forms of embodiment can also be cemented or fastened directly or indirectly by the interposition of a stiffening sleeve on a shaft or support ring.

FIG. 4 shows, by way of example, an encoder 10 partly embedded in axially extending portion 15 which may advantageously include a mounting groove 21 for encoder 10.

Figure 9:
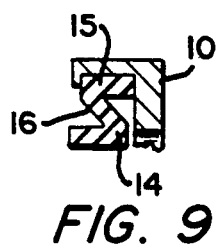

Conversely, FIG. 9 shows axially extending portion 15 embedded in a groove provided in an axial extension of encoder 10.

FIG. 5 illustrates a unit for mounting encoder 10 and the ring in which an annular sleeve 30 made of sheet metal is used into which the ring can be cemented or cast to give the assembly increased rigidity. Sleeve 30 can also include flanges 31 on one or both ends to complete the overall bond.

FIG. 6 shows a mounting unit which makes use of a sleeve 32 to reinforce the mounting support surface of the ring. Sleeve 32 can be, as necessary, combined with stiffening collar 33 or have edges 34 to protect the outside surfaces of the ring.

Figure 7:
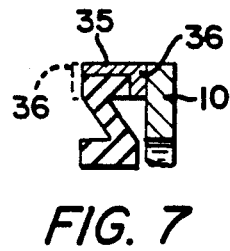

FIG. 7 shows a mounting unit in which the ring is separated from encoder 10 by the radially-oriented edge 36 of an outer retainer sleeve 35 to which the encoder is attached.

Figure 8:
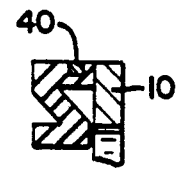

FIG. 8 shows an assembly unit in which an additional magnet 40 is mounted in the ring to provide an additional signal.

Figure 10:
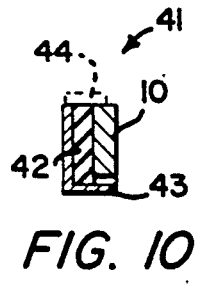
FIG. 10 shows an encoder mounted on a buffer ring.

FIG. 10 shows a mounting unit in which the encoder is supported in a composite mounting ring 41 in which a shock-absorbing element 42, made of a compressible material (e.g., foam rubber) is attached to a rigid support element 43 which is constructed to be mounted on a ring of the bearing.

Support 43 can also be provided with an additional guide support surface 44. Encoder 10 can be a predetermined distance away radially from support 43 and can be supported on shock-absorbing element 42.

Figure 11:
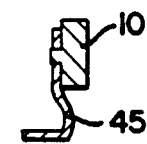
FIG. 11 shows an encoder mounted on a spring washer.

FIG. 11 shows how encoder 10 can be attached to a flexible disk 45. Disk 45 consists either of a solid washer or a partly recessed washer formed of an elastically deformable material.

Figure 12:
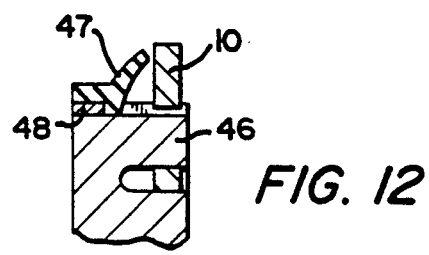
FIG. 12 shows an elastic mount of the encoder on a rotary sleeve.

FIG. 12 shows how encoder 10 can be attached to a notched hub 46. The encoder is elastically supported on an elastic washer 47 mounted either on the hub or on an intermediate support surface 48.

From the various embodiments of the invention, it is clear the contact between the sensor and the encoder can be readily achieved in the case of centering or mounting defects.

Without going beyond the scope of the invention, it is obvious that the encoder can be completely or partly integrated into the material constituting a flexible ring. Moreover, the aforementioned different arrangements for mounting the encoder can be transferred or adapted to the sensor without in any way going beyond the scope of the invention.

Having described the invention, what is claimed is:

1. A bearing assembly comprising:
    an inner race and an outer race providing an inner race—outer race annulus, one of said races being fixed, the other race being rotatable;
    rolling members located in said annulus around the inner race circumference;
    a magnetic field sensor connected to the fixed race; and
    an encoder ring with multiple north and south poles around its circumference and elastically connected to the rotatable race for rotation with rotatable race,
    the elastic connection being a biasing means for maintaining the encoder ring in slidable contact with the magnetic field sensor.

2. A bearing assembly in accordance with claim 1 wherein: the inner race is the rotatable race.

3. A bearing in accordance with claim 2 wherein the biasing means comprises: a mounting ring connected to the inner race and having an elastic portion in contact with the encoder ring, said elastic portion tapering radially inwardly from the encoder ring toward the inner race.

4. A bearing in accordance with claim 2 wherein the biasing means comprises: a member mounted about the inner race and having two radially separated axially extending portions interconnected by a diagonal flexible portion, the radially outer axially extending portion contacting the encoder ring.

5. A bearing in accordance with claim 2 wherein the biasing means comprises: an annular mounting ring about the inner race and an annular member mounted on the mounting ring and made of a compressible material, the compressible material contacting the encoder ring.

6. A bearing in accordance with claim 2 wherein the biasing means comprises: a flexible disk mounted about the inner race, and the encoder ring is attached to the flexible disk.

7. A bearing assembly in accordance with claim 1 wherein the outer race is the rotatable race.

8. A bearing in accordance with claim 7 wherein the biasing means comprises: a mounting ring connected to the outer race and having an elastic portion in contact with the encoder ring, said elastic portion tapering radially inwardly from the encoder ring toward the outer race.

9. A bearing in accordance with claim 7 wherein the biasing means comprises: a member mounted about the outer race and having two radially separated axially extending portions interconnected by a diagonal flexible portion, the radially inner axially extending portion contacting the encoder ring.

10. A bearing in accordance with claim 7 wherein the biasing means comprises: an annular mounting ring about the outer race and an annular member mounted on the mounting ring and ring and made of a compressible material, the compressible material contacting the encoder ring.

11. A bearing in accordance with claim 7 wherein the biasing means comprises: a flexible disk mounted about the outer race, and the encoder ring is attached to the flexible disk.

12. A bearing assembly comprising:
    an inner race and an outer race providing an inner race—outer race annulus, one of said races being fixed, the other race being rotatable;
    rolling members located in said annulus around the inner race circumference;
    an encoder ring with multiple north and south poles around its circumference and connected to the rotatable race for rotation with the rotatable race; and
    a magnetic field sensor elastically connected to the fixed race, the encoder ring being in slidable contact with the sensor the elastic connection comprising an annular member connected to the fixed race and having a radially extending flange axially spaced from the sensor, and an elastomer ring having its axial ends connected to the sensor and the flange at radially offset points.

* * * * *